(12) United States Patent
Wong

(10) Patent No.: US 6,741,767 B2
(45) Date of Patent: May 25, 2004

(54) PIEZOELECTRIC OPTICAL RELAY

(75) Inventor: Marvin Glenn Wong, Woodland Park, CO (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 10/109,309

(22) Filed: Mar. 28, 2002

(65) Prior Publication Data
US 2003/0189773 A1 Oct. 9, 2003

(51) Int. Cl.[7] .............................. G02B 6/26; G02B 6/34
(52) U.S. Cl. .............................. 385/16; 385/18; 385/25; 385/36
(58) Field of Search .............................. 385/16, 15, 18, 385/25, 36, 13

(56) References Cited

U.S. PATENT DOCUMENTS

| | | |
|---|---|---|
| 2,312,672 A | 3/1943 | Pollard, Jr. |
| 2,564,081 A | 8/1951 | Schilling |
| 3,430,020 A | 2/1969 | Von Tomkewitsch et al. |
| 3,529,268 A | 9/1970 | Rauterberg |
| 3,600,537 A | 8/1971 | Twyford |
| 3,639,165 A | 2/1972 | Rairden, III |
| 3,657,647 A | 4/1972 | Beusman et al. |
| 4,103,135 A | 7/1978 | Gomez et al. |
| 4,200,779 A | 4/1980 | Zakurdaev et al. |
| 4,238,748 A | 12/1980 | Goullin et al. |
| 4,245,886 A | 1/1981 | Kolodzey et al. |
| 4,336,570 A | 6/1982 | Brower |
| 4,419,650 A | 12/1983 | John |
| 4,434,337 A | 2/1984 | Becker |
| 4,475,033 A | 10/1984 | Willemsen et al. |
| 4,505,539 A | 3/1985 | Auracher et al. |
| 4,582,391 A | 4/1986 | Legrand |
| 4,628,161 A | 12/1986 | Thackrey |
| 4,652,710 A | 3/1987 | Karnowsky et al. |
| 4,657,339 A | 4/1987 | Fick |
| 4,742,263 A | 5/1988 | Harnden, Jr. et al. |
| 4,786,130 A | 11/1988 | Georgiou et al. |
| 4,797,519 A | 1/1989 | Elenbaas |
| 4,804,932 A | 2/1989 | Akanuma et al. |
| 4,988,157 A | 1/1991 | Jackel et al. |
| 5,278,012 A | 1/1994 | Yamanaka et al. |
| 5,415,026 A | 5/1995 | Ford |

(List continued on next page.)

FOREIGN PATENT DOCUMENTS

| | | |
|---|---|---|
| EP | 0593836 A1 | 4/1994 |
| FR | 2418539 | 9/1979 |
| FR | 2458138 | 12/1980 |

(List continued on next page.)

OTHER PUBLICATIONS

Marvin Glenn Wong, "Laser Cut Channel Plate For A Switch", Patent application (Agilent Ser. No. 10/317,932 filed Dec. 12, 2002), 11 pages of specifications, 5 pages of claims, 1 page of abstract, and 4 sheets of formal drawings (Fig. 1–10).

(List continued on next page.)

*Primary Examiner*—Loha Ben
*Assistant Examiner*—Jack Dinh
(74) *Attorney, Agent, or Firm*—Regan L. Trumper

(57) ABSTRACT

The present invention uses the deflection of a piezoelectric element to move an optical element into contact with the face of an optical path to redirect an optical signal. In its undeflected state, the optical signal is reflected from the angled face of the optical path by internal reflection. When the piezoelectric actuator moves the optical element into contact with the angled face of the optical path, the index of refraction of the optical path is matched and the optical signal enters the optical element and passes through.

30 Claims, 3 Drawing Sheets

U.S. PATENT DOCUMENTS

| | | | |
|---|---|---|---|
| 5,502,781 A | 3/1996 | Li et al. | |
| 5,644,676 A | 7/1997 | Blomberg et al. | |
| 5,675,310 A | 10/1997 | Wojnarowski et al. | |
| 5,677,823 A | 10/1997 | Smith | |
| 5,751,074 A | 5/1998 | Prior et al. | |
| 5,751,552 A | 5/1998 | Scanlan et al. | |
| 5,828,799 A | 10/1998 | Donald | |
| 5,841,686 A | 11/1998 | Chu et al. | |
| 5,849,623 A | 12/1998 | Wojnarowski et al. | |
| 5,874,770 A | 2/1999 | Saia et al. | |
| 5,875,531 A | 3/1999 | Nellissen et al. | |
| 5,886,407 A | 3/1999 | Polese et al. | |
| 5,889,325 A | 3/1999 | Uchida et al. | |
| 5,912,606 A | 6/1999 | Nathanson et al. | |
| 5,915,050 A | 6/1999 | Russell et al. | |
| 5,972,737 A | 10/1999 | Polese et al. | |
| 5,994,750 A | 11/1999 | Yagi | |
| 6,021,048 A | 2/2000 | Smith | |
| 6,180,873 B1 | 1/2001 | Bitko | |
| 6,201,682 B1 | 3/2001 | Mooij et al. | |
| 6,207,234 B1 | 3/2001 | Jiang | |
| 6,212,308 B1 | 4/2001 | Donald | |
| 6,225,133 B1 | 5/2001 | Yamamichi et al. | |
| 6,278,541 B1 | 8/2001 | Baker | |
| 6,304,450 B1 | 10/2001 | Dibene, II et al. | |
| 6,320,994 B1 * | 11/2001 | Donald et al. | 385/16 |
| 6,323,447 B1 | 11/2001 | Kondoh et al. | |
| 6,351,579 B1 * | 2/2002 | Early et al. | 385/18 |
| 6,356,679 B1 | 3/2002 | Kapany | |
| 6,373,356 B1 | 4/2002 | Gutierrez et al. | |
| 6,396,012 B1 | 5/2002 | Bloomfield | |
| 6,396,371 B2 | 5/2002 | Streeter et al. | |
| 6,408,112 B1 | 6/2002 | Bartels | |
| 6,446,317 B1 | 9/2002 | Figueroa et al. | |
| 6,453,086 B1 * | 9/2002 | Tarazona | 385/20 |
| 6,470,106 B2 | 10/2002 | McClelland et al. | |
| 6,487,333 B2 | 11/2002 | Fouquet | |
| 6,501,354 B1 | 12/2002 | Gutierrez et al. | |
| 6,512,322 B1 | 1/2003 | Fong et al. | |
| 6,515,404 B1 | 2/2003 | Wong | |
| 6,516,504 B2 | 2/2003 | Schaper | |
| 6,559,420 B1 | 5/2003 | Zarev | |
| 6,633,213 B1 | 10/2003 | Dove | |
| 2002/0037128 A1 * | 3/2002 | Burger et al. | 385/16 |
| 2002/0146197 A1 * | 10/2002 | Yong | 385/17 |
| 2002/0150323 A1 * | 10/2002 | Nishida et al. | 385/16 |
| 2002/0168133 A1 * | 11/2002 | Saito | 385/16 |
| 2003/0035611 A1 * | 2/2003 | Shi | 385/16 |
| 2003/0123786 A1 * | 7/2003 | Yee | 385/16 |

FOREIGN PATENT DOCUMENTS

| | | |
|---|---|---|
| FR | 2667396 | 4/1992 |
| JP | SHO 36-18575 | 10/1961 |
| JP | SHO 47-21645 | 10/1972 |
| JP | 62-276838 | 12/1987 |
| JP | 63-294317 | 12/1988 |
| JP | 8-125487 | 5/1996 |
| JP | 9-161640 | 6/1997 |
| WO | WO99/46624 | 12/1999 |

OTHER PUBLICATIONS

Homi C. Bhedwar et al., "Ceramic Multilayer Package Fabrication", Nov. 1989, Electronic Materials Handbook, vol. 1 Packaging, Section 4: pp. 460–469.

Marvin Glenn Wong, "A Piezoelectricaly Actuated Liquid Metal Switch", May 2, 2002, patent application (pending), 12 pages of specification, 5 pages of claims, 1 page of abstract, and 10 sheets of drawings (Fig. 1–10).

Jonathan Simon et al., "A Liquid–Filled Microrelay With A Moving Mercury Microdrop", Journal of Microelectromechanical Systems, vol. 6, No. 3, Sep. 1977, pp. 208–216.

Joonwon Kim et al., "A Micromechanical Switch With Electrostatically Driven Liquid–Metal Droplet", 4 pages.

TDG–ACC–NO:NB8406827, "Integral Power Resistors For Aluminum Substrate", IBM Technical Disclosure Bulletin, Jun. 1984, US, vol. 27, Issue No. 1B, p. 827.

\* cited by examiner

PIEZOELECTRIC OPTICAL RELAY

BACKGROUND

Piezoelectric materials and magnetostrictive materials (collectively referred to below as "piezoelectric materials") deform when an electric field or magnetic field is applied. Thus piezoelectric materials, when used as an actuator, are capable or controlling the relative position of two surfaces.

Piezoelectricity is the general term to describe the property exhibited by certain crystals of becoming electrically polarized when stress is applied to them. Quartz is a good example of a piezoelectric crystal. If stress is applied to such a crystal, it will develop an electric moment proportional to the applied stress.

This is the direct piezoelectric effect. Conversely, if it is placed on an electric field, a piezoelectric crystal changes its shape slightly. This is the inverse piezoelectric effect.

One of the most used piezoelectric materials is the aforementioned quartz. Piezoelectricity is also exhibited by ferroelectric crystals, e.g. tourmaline and Rochelle salt. These already have a spontaneous polarization, and the piezoelectric effect shows up in them as a change in this polarization. Other piezoelectric materials include certain ceramic materials and certain polymer materials. Since they are capable of controlling the relative position of two surfaces, piezoelectric materials have been used in the past as valve actuators and positional controls for microscopes. Piezoelectric materials, especially those of the ceramic type, are capable of generating a large amount of force. However, they are only capable of generating a small displacement when a large voltage is applied. In the case of piezoelectric ceramics, this displacement can be a maximum of 0.1% of the length of the material. Thus, piezoelectric materials have been used as valve actuators and positional controls for applications requiring small displacements.

Two methods of generating more displacement per unit of applied voltage include bimorph assemblies and stack assemblies. Bimorph assemblies have two piezoelectric ceramic materials bonded together and constrained by a rim at their edges, such that when a voltage is applied, one of the piezoelectric materials expands. The resulting stress causes the materials to form a dome. The displacement at the center of the dome is larger than the shrinkage or expansion of the individual materials. However, constraining the rim of the bimorph assembly decreases the amount of available displacement. Moreover, the force generated by a bimorph assembly is significantly lower than the force that is generated by the shrinkage or expansion of the individual materials.

Stack assemblies contain multiple layers of piezoelectric materials interlaced with electrodes that are connected together. A voltage across the electrodes causes the stack to expand or contract. The displacement of the stack is equal to the sum of the displacements of the individual materials. Thus, to achieve reasonable displacement distances, a very high voltage or many layers are required. However, convention stack actuators lose positional control due to the thermal expansion of the piezoelectric material and the material(s) on which the stack is mounted.

Due to the high strength, or stiffness, of piezoelectric material, it is capable of opening and closing against high forces, such as the force generated by a high pressure acting on a large surface area. Thus, the high strength of the piezoelectric material allows for the use of a large valve opening, which reduces the displacement or actuation necessary to open or close the valve.

With a conventional piezoelectrically actuated relay, the relay is "closed" by moving a mechanical part so that two electrode components are in contact. The relay is "opened" by moving the mechanical part so the two electrode components are no longer in contact. The electrical switching point corresponds to the contact between the electrode components of the solid electrodes. Conventional piezoelectrically actuated relays, however, do not latch easily. If latching is available, a residual charge in the piezoelectric material is used or switch contacts that contain a latching mechanism is used.

Conventional optical relays and relay arrays use the creation of bubbles in the optical path to switch the optical signals and do not latch. Further, bubble type relays tend to have large power consumption and to generate unwanted heat.

SUMMARY

The present invention uses the deflection of a piezoelectric element to move an optical element into contact with the face of an optical path to redirect an optical signal. In its undeflected state, the optical signal is reflected from the angled face of the optical path by internal reflection. When the piezoelectric actuator moves the optical element into contact with the angled face of the optical path, the index of refraction of the optical path is matched and the optical signal enters the optical element and passes through. Coatings that match the index of refraction of the optical path can be used on the optical element for higher efficiency. The optical switch actuator can use a bending mode piezoelectric element to displace the optical element. The optical switch actuator can also use other modes of piezoelectric elements to displace the optical element.

DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION OF THE INVENTION

Figure 1:
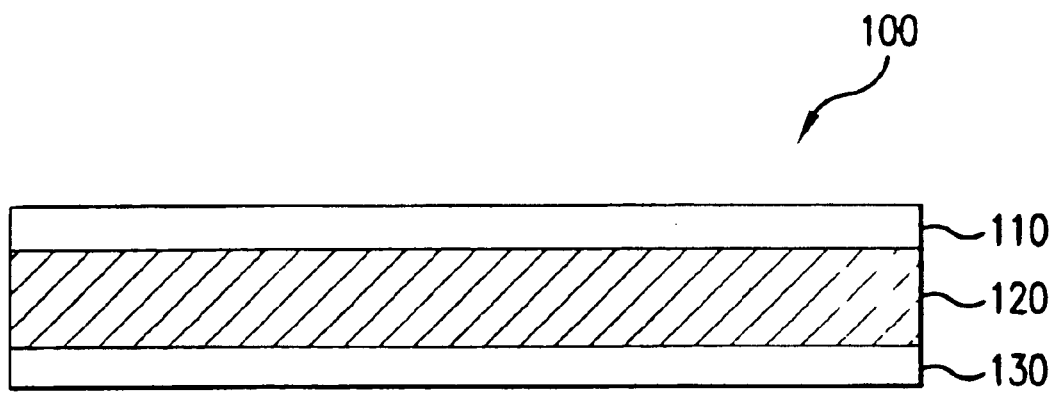
FIG. 1 shows a side view of a piezoelectric optical relay in accordance with the invention.

FIG. 1 is a side view of a piezoelectric optical relay 100 in accordance with the invention. Three layers of the relay 100 are shown. The top layer 110 is a cap layer that acts to seal the top of the relay. The middle layer 120 is an optical layer which houses the actuation means and optics of the relay. The bottom layer 130 is a cap layer which acts to seal the bottom of the relay. Any of the three layers 110, 120, 130 can be used to hold the electrical connections used to supply power to the actuation means of the relay. Preferably, the middle optical layer 120 contains the electrical connections used to supply power to the actuation means of the relay.

Figure 2:
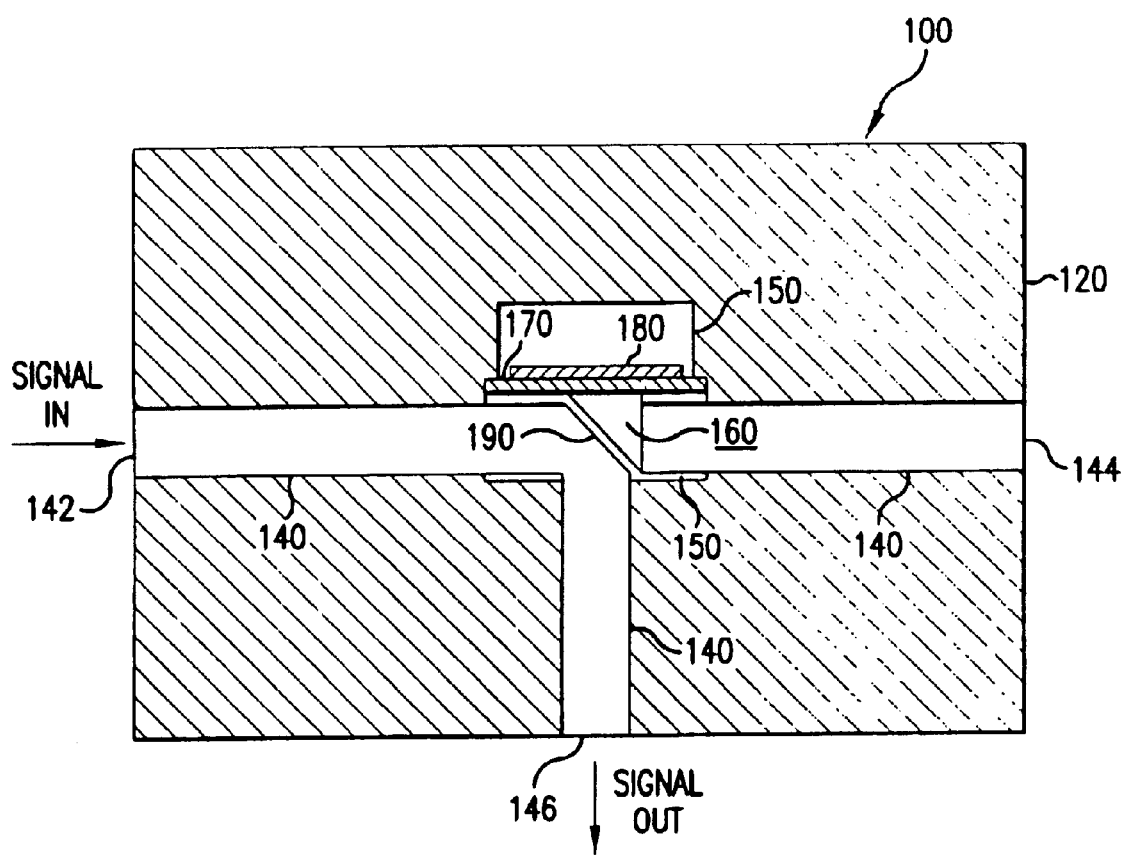
FIG. 2 shows a top view of an optical layer of a piezoelectric optical relay with the optical element undeflected in accordance with the invention.

Referring now to FIG. 2, a top view of the optical layer 120 of the piezoelectric optical relay 100 in accordance with the invention is shown. An optical wave guide 140 passes through the layer 120. The wave guide 140 enters at a first point 142 where an optical signal enters the relay 100. The wave guide 140 diverges in the center of the optical layer 120. Two signal out paths 144, 146 stem from the divergence of the optical wave guide 140.

The wave guide 140 diverges in the center of the optical layer 120 inside of a chamber 150. The chamber 150 houses the actuation means for the relay 100. Inside the chamber 150 is a moveable optical path wedge 160, a diaphragm 170 which sits below the wedge 160 and is attached thereto, and a piezoelectric element 180. The wedge 160 is moveable in and out of a notch 190 in the wave guide 140.

The chamber 150 comprises at least two ledges 152, 154 which act as supports to which the diaphragm 170 is attachable. The diaphragm 170 attaches to the underside of the ledges 152, 154. It is understood that the side walls of the chamber can be straight, without ledges. In such case, the diaphragm 170 attaches to the side walls. It will be obvious to those skilled in the art that many methods of attaching the diaphragm to the sidewalls is possible. For example only, the diaphram can be laminated to the sidewalls or the sidewalls can have notches sized to the diaphragm. Also as an example, the ledge could be upside-down of that shown in FIG. 1 so that the diaphragm sits on the ledge.

The piezoelectric element 180 is operable utilizing any mode of piezoelectric actuation. Preferrably, the piezoelectric element 180 is a bending mode piezoelectric element. The piezoelectric element 180 is attached to the diaphragm 170. Preferably the piezoelectric element 180 is laminated to the diaphragm 170 but it is understood that any method of maintaining enough proximity between the diaphragm and the piezoelectric element so that they will bend together and move the optical element is sufficient. The diaphragm 170 can be made of any material that is flexible. Preferably the diaphragm is made of stainless steel; alternative materials include brass, beryllium copper, spring steel, or piezoelectric material polarized and wired opposite to the piezoelectric element 180 so that when one expands the other shrinks to produce the bending action. Polymer may also be used. The circuit traces for the piezoelectric element 180 are not shown in FIG. 3.

In operation, the switching mechanism of the invention operates by displacement of the piezoelectric elements 180. In a preferred embodiment, the bending mode piezoelectric element 180 bends downward. Bending of the piezoelectric element 180 causes the diaphragm 170 to deflect downward. Downward deflection of the diaphragm 170 causes the optical element 160 to insert into the notch 190. The circuit traces for the piezoelectric element 180 are not shown in FIG. 3.

Figure 3:
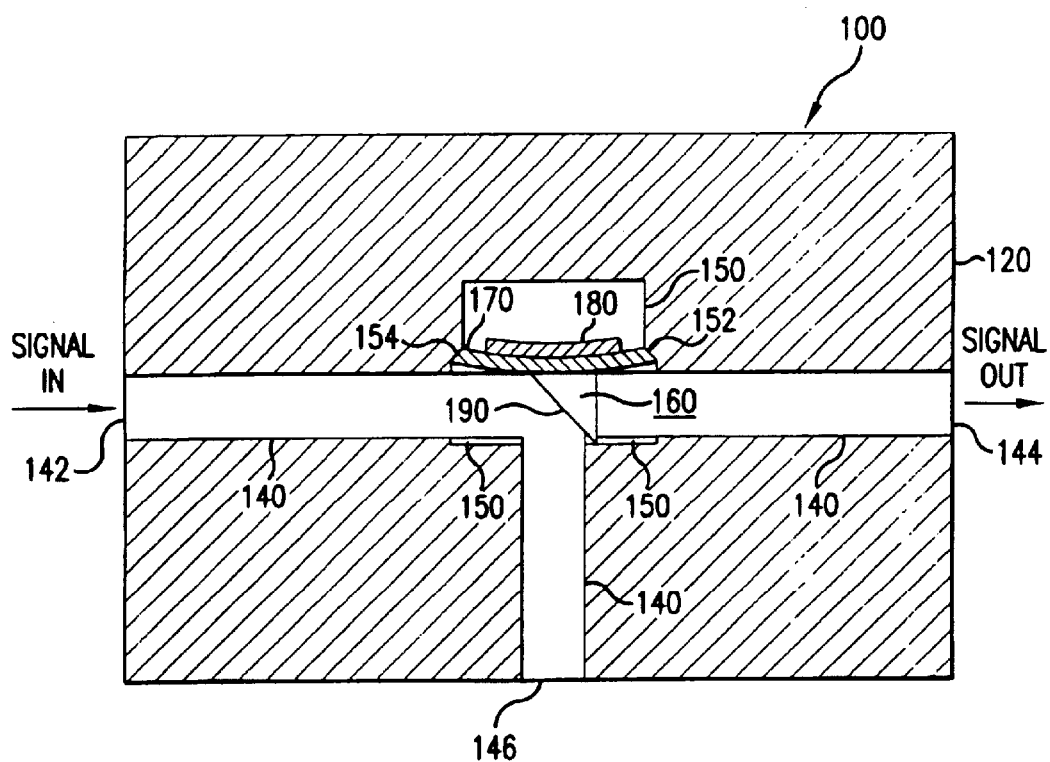
FIG. 3 shows a top view of an optical layer of a piezoelectric optical relay with the optical element deflected in accordance with the invention.

FIG. 3 shows a top view of an optical layer 120 of a piezoelectric optical relay 100 with the optical element 160 deflected in accordance with the invention. Optical element 160 is deflected into the notch 190 so that an optical signal traveling entering at the first point 142 of the wave guide 140 will not reflect off of the angled face of the notch and be deflected along the waveguide toward port 146. When the piezoelectric element 180 bends the diaphragm 170 and moves the optical element 160 into contact with the face of the optical path 140, the index of refraction of the optical path 140 is matched and the optical signal enters the optical element 160. The optical signal travels through the optical element 160 and through signal out path 144. In a preferred embodiment of the invention, the optical element 160 is coated with a coating that matches the index of refraction of the optical path. The coating may be a material that is similar to the optical path and is typically composed of thin layers of transparent metal oxides. In a more preferred embodiment of the invention, the coating acts as a filter so that only the wavelength of choice is passed and all others are reflected. The filter works when the triangular element is down and in contact with the waveguide. When the triangular element is up, all of the wavelengths are deflected toward waveguide 146 by internal reflection.

Also in a preferred embodiment of the invention, the optical element 160 is triangular. It is understood that other shapes of optical elements can be used which provide for reflection into optical path 146 when not engaged and for refraction into optical path 144 when engaged. It is understood by those skilled in the art that the invention is not limited to the bending piezoelectric element 180 shown in the figures. For example, the piezoelectric element can be an extension mode piezoelectric element, a shear mode piezoelectric element or other mode of piezoelectric element capable of bending the diaphragm.

What is claimed is:

1. A piezoelectric optical relay comprising:
    a piezoelectric element;
    a diaphragm having a first and a second side, said first side abutting said piezoelectric element;
    an optical path comprising an entry point, a first egression point, a second egression point and a divergence point, said divergence point comprising a notch in said path; and
    an optical element affixed to said second side;
    wherein said optical element is moveable into said notch.

2. The piezoelectric optical relay of claim 1 further comprising a chamber wherein said piezoelectric element, said diaphragm, said optical element and said divergence point are with said chamber.

3. The piezoelectric optical relay of claim 2 wherein said chamber comprises a first and second ledge and said diaphragm extends between said first and said second ledge and said diaphragm is affixed to said first and said second ledge.

4. The piezoelectric optical relay of claim 3 wherein sad first and said second ledge are oriented so that said ledges face the optical path.

5. The piezoelectric optical relay of claim 4 wherein said piezoelectric element is a bending mode piezoelectric element.

6. The piezoelectric optical relay of claim 5 wherein said piezoelectric element is laminated to said diaphragm.

7. The piezoelectric optical relay of claim 6 wherein said optical element is triangular.

8. The piezoelectrical optical relay of claim 7 wherein said optical element is coated with a substance so that the index of refraction substantially matches the optical path.

9. The piezoelectric optical relay of claim 8 wherein said substance is from the group comprising metal oxides, semiconductor oxides, metal nitrides, or semiconductor nitrides, or combinations thereof.

10. The piezoelectric optical relay of claim 9 wherein said diaphragm is from the group comprising stainless steel, brass, beryllium copper, spring steel, ceramic, or polymer.

11. The piezoelectric optical relay of claim 8 wherein said substance acts as a filter.

12. A method of actuating an optical relay, said optical relay comprising an optical path having a first and second egressing paths and a notch, a point of divergence, an optical element and a chamber, wherein said method comprises the steps of:
    causing said optical element to move into said notch by bending a diaphragm, said diaphragm being in contact with said optical element.

13. The method of actuating an optical relay of claim 12, wherein moving said diaphragm comprises causing a piezoelectric element to deflect, said piezoelectric element being in contact with said diaphragm.

14. The method of actuating an optical relay of claim 13, wherein said notch is triangular and said notch is coated to match the index of refraction of the optical path.

15. The method of actuating an optical relay of claim 14, wherein said notch is coated with a substance from the group comprising metal oxides, semiconductor oxides, metal nitrides, or semiconductor nitrides, or combinations thereof.

16. The method of actuating an optical relay of claim 15, wherein said diaphragm is constructed of a material from the group comprising stainless steel, brass, beryllium copper, spring steel, ceramic, or polymer.

17. The method of actuating an optical relay of claim 16, wherein said piezoelectric element is a bending mode piezoelectric element.

18. A piezoelectric optical relay comprising:
   an optical path having a notch and a first and a second signal out path, said notch being located at a point where the first and second signal out paths converge;
   an optical element situated to be inserted into said notch;
   a diaphragm abutting a side of the optical element opposite said notch;
   a piezoelectric element abutting a side of said diaphragm opposite said optical element;
   wherein said optical element is moveable into said notch.

19. The piezoelectric optical relay of claim 18, further comprising a chamber wherein said notch, said optical element, said diaphragm and said piezoelectric element are positioned inside said chamber.

20. The piezoelectric optical relay of claim 19, wherein said diaphragm is attached to the sidewalls of said chamber.

21. The piezoelectric optical relay of claim 20, wherein said chamber has a first and second ledge.

22. The piezoelectric optical relay of claim 21 wherein said diaphragm is attached to said first and said second ledge.

23. A piezoelectric optical relay comprising:
   a top cap layer;
   an optical layer situated below said top cap layer, and a bottom cap layer situated below said optical layer,
   wherein said optical layer comprises a piezoelectric element,
   a diaphragm having a first and a second side, said first side abutting said piezoelectric element,
   an optical path comprising an entry point, a first egression port, a second egression port and a divergence point, said divergence point comprising a notch in said path, and
   an optical element affixed to said second side of said diaphragm;
   wherein said optical element is moveable into said notch.

24. The piezoelectric optical relay of claim 23 further comprising a chamber wherein said piezoelectric element, said diaphragm, said optical element and said divergence point are with said chamber.

25. The piezoelectric optical relay of claim 24 wherein said optical element is moveable into said notch due to flexing action of the diaphragm and wherein said diaphragm flexes due to extension of said piezoelectric element.

26. The piezoelectric optical relay of claim 25 wherein said piezoelectric element is a bending mode piezoelectric element.

27. The piezoelectric optical relay of claim 26 wherein wherein said optical element is coated with a substance so that the index of refraction substantially matches the optical path.

28. The piezoelectric optical relay of claim 27 wherein said substance is from the group comprising metal oxides, semiconductor oxides, metal nitrides, or semiconductor nitrides, or combinations thereof.

29. The piezoelectric optical relay of claim 28 wherein said diaphragm is from the group comprising stainless steel, brass, beryllium copper, spring steel, ceramic, or polymer.

30. The piezoelectric optical relay of claim 28 wherein said substance acts as a filter.

* * * * *